US009042477B2

(12) United States Patent
Park et al.

(10) Patent No.: US 9,042,477 B2
(45) Date of Patent: *May 26, 2015

(54) APPARATUSES AND METHODS FOR DATA TRANSMISSION AND RECEPTION

(71) Applicant: Samsung Electronics Co., Ltd., Suwon-si (KR)

(72) Inventors: Tae Rim Park, Seoul (KR); Ui Kun Kwon, Hwaseong-si (KR); Young Soo Kim, Seoul (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 14/257,293

(22) Filed: Apr. 21, 2014

(65) Prior Publication Data

US 2014/0269569 A1      Sep. 18, 2014

Related U.S. Application Data

(63) Continuation of application No. 13/033,750, filed on Feb. 24, 2011, now Pat. No. 8,705,660.

(30) Foreign Application Priority Data

Apr. 1, 2010 (KR) .................. 10-2010-0029983

(51) Int. Cl.
*H04W 72/04* (2009.01)
*H04L 27/26* (2006.01)

(52) U.S. Cl.
CPC ....... *H04W 72/0473* (2013.01); *H04L 27/2613* (2013.01); *H04L 27/2626* (2013.01)

(58) Field of Classification Search
CPC . H04L 27/2602; H04L 27/261; H04L 5/0048; H04W 72/0473
USPC .......... 375/260, 267, 295, 299, 316, 340, 347
See application file for complete search history.

(56) References Cited

U.S. PATENT DOCUMENTS

| 5,376,975 | A  | 12/1994 | Romero et al. |
| 7,158,542 | B1 | 1/2007  | Zeng et al. |
| 7,885,177 | B2 | 2/2011  | Kopmeiners et al. |

(Continued)

FOREIGN PATENT DOCUMENTS

| CN | 1091557 A        | 8/1994 |
| KR | 10-2006-0010309 A | 2/2006 |
| KR | 10-2009-0015687 A | 2/2009 |
| KR | 10-2009-0040726 A | 4/2009 |

(Continued)

OTHER PUBLICATIONS

International Search Report issued Oct. 21, 2011, in counterpart International Application No. PCT/KR2011/000927 (3pp).

(Continued)

*Primary Examiner* — Leon Flores
(74) *Attorney, Agent, or Firm* — NSIP Law

(57) ABSTRACT

Provided is a data transmission system of providing preambles of different classes according to a characteristic of a terminal. A terminal having constraints on using a power with respect to a data reception may receive only a preamble of a particular class and thus decrease a power consumption. A general terminal may receive preambles of plural classes and quickly receive data.

20 Claims, 11 Drawing Sheets

(56) References Cited

U.S. PATENT DOCUMENTS

| | | |
|---|---|---|
| 8,315,330 B2 | 11/2012 | Moon et al. |
| 8,705,660 B2 * | 4/2014 | Park et al. .................. 375/316 |
| 2006/0025079 A1 | 2/2006 | Sutskover et al. |
| 2007/0064745 A1 | 3/2007 | Zeng et al. |
| 2009/0046611 A1 | 2/2009 | Ryu et al. |
| 2009/0175372 A1 | 7/2009 | Moon et al. |

FOREIGN PATENT DOCUMENTS

KR  10-2010-0021872 A  2/2010

OTHER PUBLICATIONS

Chinese Office Action issued on Nov. 4, 2014 in counterpart Chinese Application No. CN 201180027013.2 (20 pages with English translation).

* cited by examiner

APPARATUSES AND METHODS FOR DATA TRANSMISSION AND RECEPTION

CROSS-REFERENCE TO RELATED APPLICATION(S)

This application is a Continuation Application of U.S. application Ser. No. 13/033,750, filed Feb. 24, 2011, which claims the benefit under 35 U.S.C. §119(a) of Korean Patent Application No. 10-2010-0029983, filed on Apr. 1, 2010, in the Korean Intellectual Property Office, the entire disclosure of which is incorporated herein by reference for all purposes.

BACKGROUND

1. Field

The following description relates to a mobile communication field, and more particularly, to a preamble structure of transmitting preambles of different classes.

2. Description of Related Art

A reception apparatus may receive data from a transmission apparatus. In general, the reception apparatus may be unaware of when the transmission apparatus transmits data. In cases in which the reception apparatus waits for data to be transmitted from the transmission apparatus at all times, the reception apparatus may use a significantly great amount of power to receive the data. Accordingly, in an idle state, the reception apparatus may periodically monitor whether the transmission apparatus has transmitted data. Only when the transmission apparatus transmits the data may the reception apparatus shift from the idle state to an active state and receive the data.

For the above operation, the transmission apparatus may include a preamble within a frame to transmit the data. In the idle status, the reception apparatus may periodically attempt a detection of the preamble that may have been transmitted from the transmission apparatus. When the reception apparatus succeeds in detecting the preamble, the reception apparatus determines that data is ready to be transmitted from the transmission apparatus, and thus may shift from the idle state to the active state to receive the data.

Conventional systems and methods use power inefficiently.

SUMMARY

In one general aspect, there is provided a transmission apparatus, including: a first preamble transmitter configured to transmit a first preamble and first data to a first reception apparatus, the first reception apparatus being configured to receive the first data, depending on whether the first preamble is detected, and a second preamble transmitter configured to transmit a second preamble and second data to the first reception apparatus and a second reception apparatus, the first reception apparatus and the second reception apparatus being configured to receive the second data, depending on whether the second preamble is detected.

In the transmission apparatus, a length of the first preamble is an integer multiple of a length of the second preamble.

In the transmission apparatus, the second preamble transmitter is further configured to repeatedly transmit the second preamble during a time interval in which the first preamble is transmitted.

In the transmission apparatus, the second reception apparatus is configured to be supplied with a power using a battery.

In another general aspect, there is provided a reception apparatus, including: a receiver configured to receive, from a transmission apparatus, a signal including a first preamble or a second preamble, a control signal receiver configured to receive a control signal, a first preamble detector configured to detect the first preamble, and a second preamble detector configured to detect the second preamble, wherein the control signal receiver is further configured to activate the first preamble detector or the second preamble detector, according to the control signal, and wherein, in response to the first preamble or the second preamble being detected, the receiver is further configured to receive data from the transmission apparatus.

In the reception apparatus, a length of the first preamble is an integer multiple of a length of the second preamble.

In another general aspect, there is provided a reception apparatus, including: a preamble detector configured to detect a first preamble or a second preamble, received from a transmission apparatus, and a receiver configured to receive data from the transmission apparatus, depending on whether the first preamble or the second preamble is detected, wherein a second reception apparatus is configured to: detect the second preamble received from the transmission apparatus, and receive second data from the transmission apparatus, depending on whether the second preamble is detected.

In the reception apparatus, a length of the first preamble is an integer multiple of a length of the second preamble.

In the reception apparatus, the transmission apparatus is further configured to repeatedly transmit the second preamble during a time interval in which the first preamble is transmitted.

In another general aspect, there is provided a reception apparatus, including: a detector configured to detect a first preamble received from a transmission apparatus, and a receiver configured to receive data from the transmission apparatus, depending on whether the first preamble is detected, wherein a second reception apparatus is configured to: detect the first preamble or a second preamble received from the transmission, and receive second data from the transmission apparatus, depending on whether the second preamble is detected.

In the reception apparatus, a length of the first preamble is an integer multiple of a length of the second preamble.

In another general aspect, there is provided a transmission method, including: transmitting a first preamble and first data to a first reception apparatus, the first data being received by the first reception apparatus, depending on whether the first preamble is detected, and transmitting a second preamble and second data to the first reception apparatus and a second reception apparatus, the second data is received by the first reception apparatus or the second reception apparatus, depending on whether the second preamble is detected.

In the transmission method, a length of the first preamble is an integer multiple of a length of the second preamble.

In the transmission method, the transmitting of the second preamble includes repeatedly transmitting the second preamble during a time interval in which the first preamble is transmitted.

In another general aspect, there is provided a reception method, including: receiving, from a transmission apparatus, a signal including a first preamble or a second preamble, receiving a control signal, detecting the first preamble or the second preamble, according to the control signal, and receiving data from the transmission apparatus, depending on whether the first preamble or the second preamble is detected.

In the reception method, a length of the first preamble is an integer multiple of a length of the second preamble.

In another general aspect, there is provided a reception method, including: detecting a first preamble or a second preamble, received from a transmission apparatus, and receiving data from the transmission apparatus, depending on whether the first preamble or the second preamble is detected, wherein a reception apparatus: detects the second preamble received from the transmission apparatus, and receives second data from the transmission apparatus, depending on whether the second preamble is detected.

In another general aspect, there is provided a reception method, including: detecting a first preamble received from a transmission apparatus, and receiving data from the transmission apparatus, depending on whether the first preamble is detected, wherein a second reception apparatus detects the first preamble or a second preamble received from the transmission apparatus, and receives second data from the transmission apparatus, depending on whether the first preamble or the second preamble is detected.

In another general aspect, there is provided a reception apparatus, including: a preamble detector configured to detect a first preamble or a second preamble, received from a transmission apparatus, a receiver configured to receive data from the transmission apparatus, depending on whether the first preamble or the second preamble is detected, and a reception unit configured to: detect the second preamble received from the transmission apparatus, and receive second data from the transmission apparatus, depending on whether the second preamble is detected.

In the reception apparatus, a length of the first preamble is an integer multiple of a length of the second preamble.

In the reception apparatus, the transmission apparatus is further configured to repeatedly transmit the second preamble during a time interval in which the first preamble is transmitted.

In another general aspect, there is provided a reception apparatus, including: a detector configured to detect a first preamble received from a transmission apparatus, and a receiver configured to receive data from the transmission apparatus, depending on whether the first preamble is detected, and a reception unit configured to: detect the first preamble or a second preamble received from the transmission, and receive second data from the transmission apparatus, depending on whether the second preamble is detected.

In the reception apparatus, a length of the first preamble may be an integer multiple of a length of the second preamble.

In another general aspect, there is provided a reception method, including: detecting a first preamble received from a transmission apparatus, receiving data from the transmission apparatus, depending on whether the first preamble is detected, detecting, by a reception unit, the first preamble or a second preamble received from the transmission apparatus, and receiving, by the reception unit, second data from the transmission apparatus, depending on whether the first preamble or the second preamble is detected.

A non-transitory computer-readable medium may include a program for instructing a computer to perform any of the above methods.

Other features and aspects may be apparent from the following detailed description, the drawings, and the claims.

Figure 1:
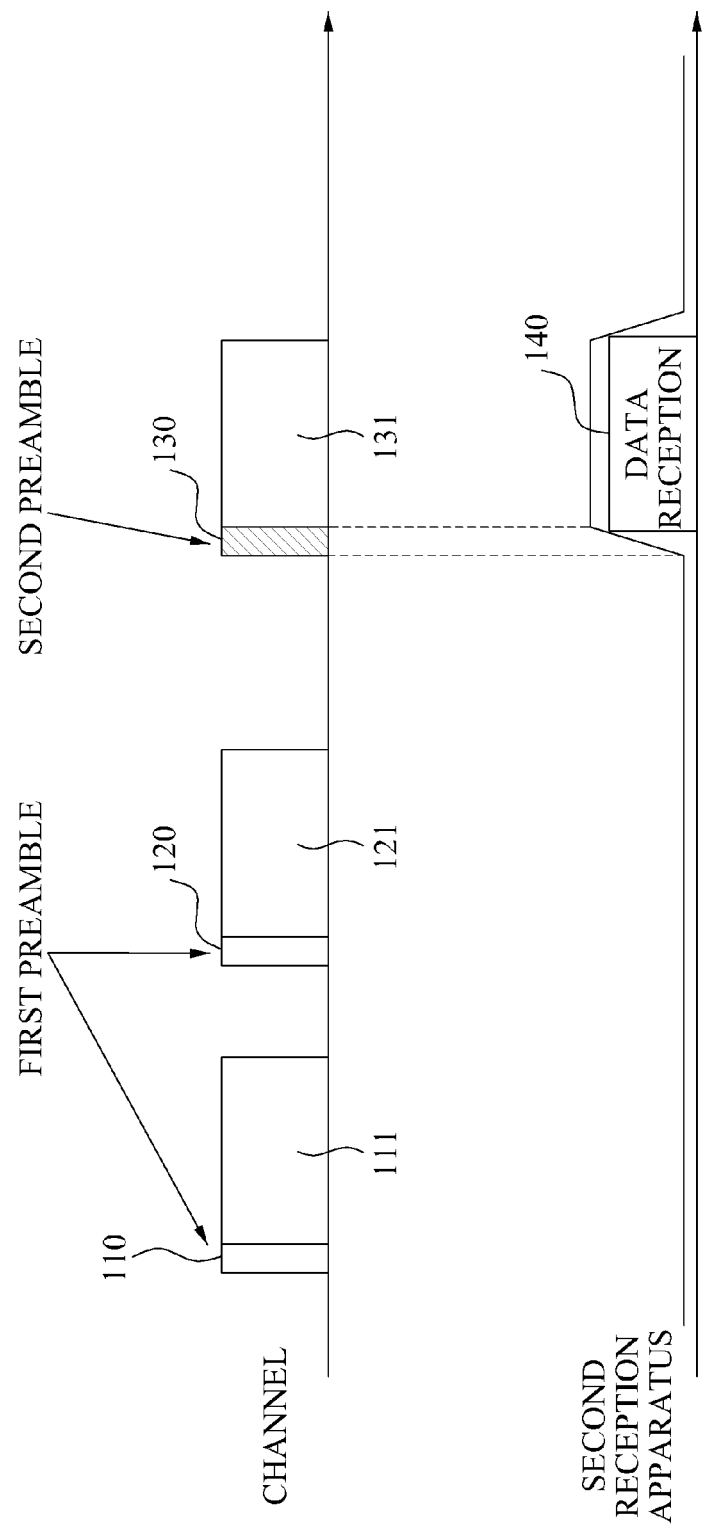
FIG. 1 is a diagram to describe an example of a method of transmitting and receiving data using a multi-class preamble structure.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, description of well-known functions and constructions may be omitted for increased clarity and conciseness.

FIG. 1 illustrates a diagram to describe an example of a method of transmitting and receiving data using a multi-class preamble structure.

According to an embodiment, a transmission apparatus (e.g., transmission apparatus 500 in the example of FIG. 5, below) may transmit, to a reception apparatus (e.g., first reception apparatus 540 or second reception apparatus 550 in the example of FIG. 5, below), a data frame containing data. In an idle state, the reception apparatus may detect a preamble included in the data frame. In response to the reception apparatus succeeding in a detection of the preamble, the reception apparatus may determine data is being transmitted from the transmission apparatus. In response to the data not being transmitted from the transmission apparatus, the reception apparatus may maintain the idle state and decrease a power communication. Conversely, in response to the data being transmitted from the transmission apparatus, the reception apparatus may shift from the idle state to an active state to receive the data.

The transmission apparatus may transmit data to a plurality of reception apparatuses having different characteristics (e.g., first reception apparatus 540 or second reception apparatus 550 in the example of FIG. 5, below). For example, a first reception apparatus may be stably supplied with a power from a power socket, and the like. The first reception apparatus may receive data without a limitation on the power. A second reception apparatus may be supplied with the power using a battery, and the like. The second reception apparatus may have some constraints on receiving the data due to a limitation of the power.

The transmission apparatus may transmit different preambles designed based on characteristics of the respective reception apparatuses. Each of the reception apparatuses may detect a portion of or all of the preambles based on corresponding characteristics. For example, the first reception apparatus may detect both a first preamble and a second preamble. For example, the first reception apparatus, which may not be affected by the power limitation, may detect all the preambles, and may quickly receive data from the transmission apparatus. The second reception apparatus, which may be affected by the power limitation, may detect only the second preamble, and may effectively receive data.

Referring to FIG. 1, a transmission apparatus may transmit, to a second reception apparatus, data frames 111 and 121 containing first preambles 110 and 120, and a data frame 131 containing a second preamble 130. In this instance, the second reception apparatus may not detect the first preambles 110 and 120, and thus may not receive data included in the data frames 111 and 121 containing the first preambles 110 and 120. The second reception apparatus may detect the second preamble 130, and thus may receive data 140 included in the data frame 131 containing the second preamble 130.

According to another embodiment, a first reception apparatus may detect only a first preamble, and may receive data from a transmission apparatus. A second reception apparatus may detect only a second preamble and receive data from the transmission apparatus.

Figure 2:
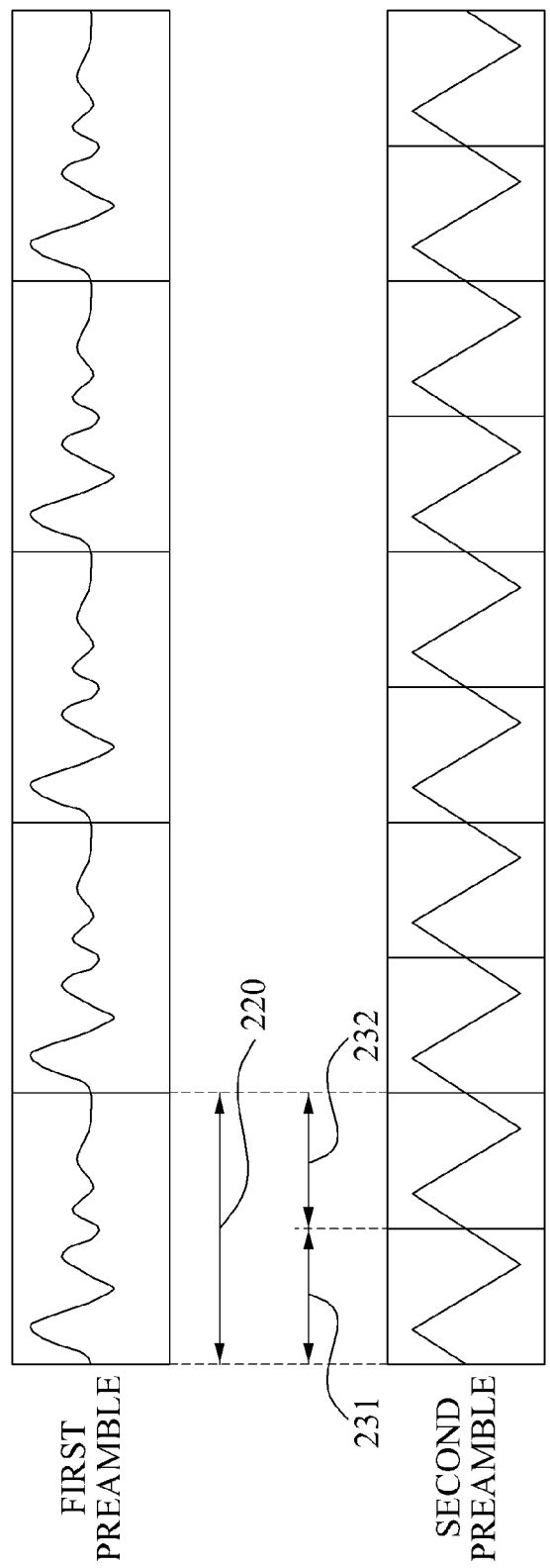
FIG. 2 is a diagram illustrating an example of multiple preambles.

FIG. 2 illustrates an example of multiple preambles.

Referring to FIG. 2, a first preamble may be repeatedly transmitted during every first time interval 220. A second preamble may be repeatedly transmitted during every second time interval 231 or 232. A transmission apparatus may transmit all of the first preamble and the second preamble. Each of reception apparatuses may receive a preamble corresponding to a characteristic of a corresponding reception apparatus.

A length of the first time interval 220 may be different from a length of the second time interval 231 or 232. As shown in FIG. 2, the first time interval 220 may be an integer multiple of the second time interval 231 or 232.

A first reception apparatus may receive preambles repeated during every first time interval 220. Referring to FIG. 2, the first reception apparatus may receive the first preamble and the second preamble repeated during every first time interval 220.

A second reception apparatus may receive preambles repeated during every second time interval 231 or 232. Referring to FIG. 2, the second reception apparatus may receive the second preamble repeated during every second time interval 231 or 232. However, the second reception apparatus may not receive the first preamble.

Figure 3:
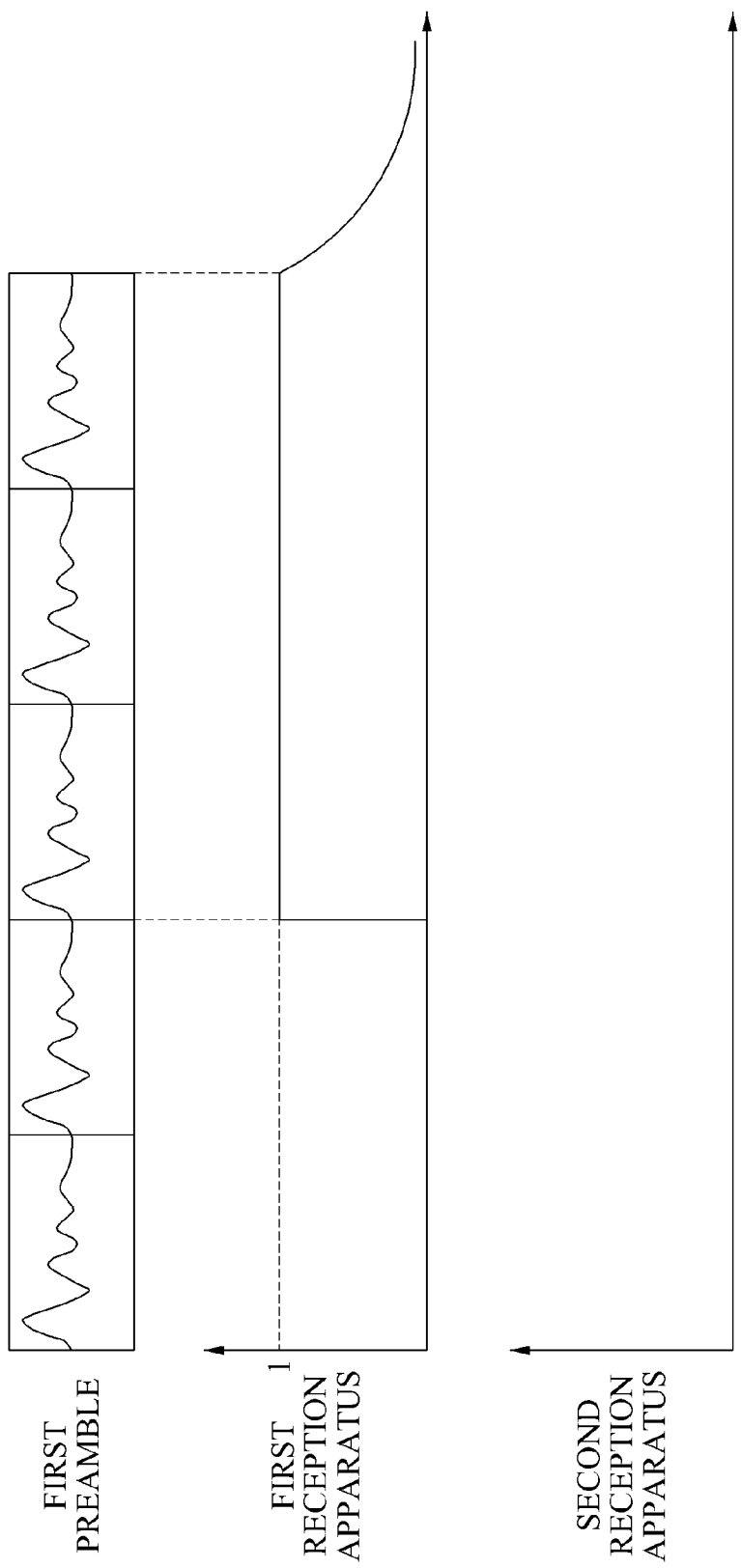
FIG. 3 is a diagram illustrating an example of each reception apparatus receiving a first preamble.

FIG. 3 illustrates an example of each reception apparatus receiving a first preamble.

A first reception apparatus may detect the first preamble by correlating a first correlation signal with a signal received from a transmission apparatus. A length of the first correlation signal may be the same as a length of a first time interval. For example, in response to the length of the first correlation signal being the same as a length of the first preamble, the first reception apparatus may detect preambles repeated during every first time interval.

Referring to FIG. 3, the first reception apparatus may detect the first preamble after the first preamble is repeated twice.

A second reception apparatus may detect a second preamble by correlating a second correlation signal with the signal received from the transmission apparatus. A length of the second correlation signal may be the same as a length of a second time interval. For example, in response to the length of the second correlation signal being the same as a length of the second preamble, the second reception apparatus may detect preambles repeated during every second time interval.

However, in response to the length of the first preamble being an integer multiple of the length of the second correlation signal, the second reception apparatus may not detect the first preamble. Referring to FIG. 3, the second reception apparatus may not detect the first preamble.

Figure 4:
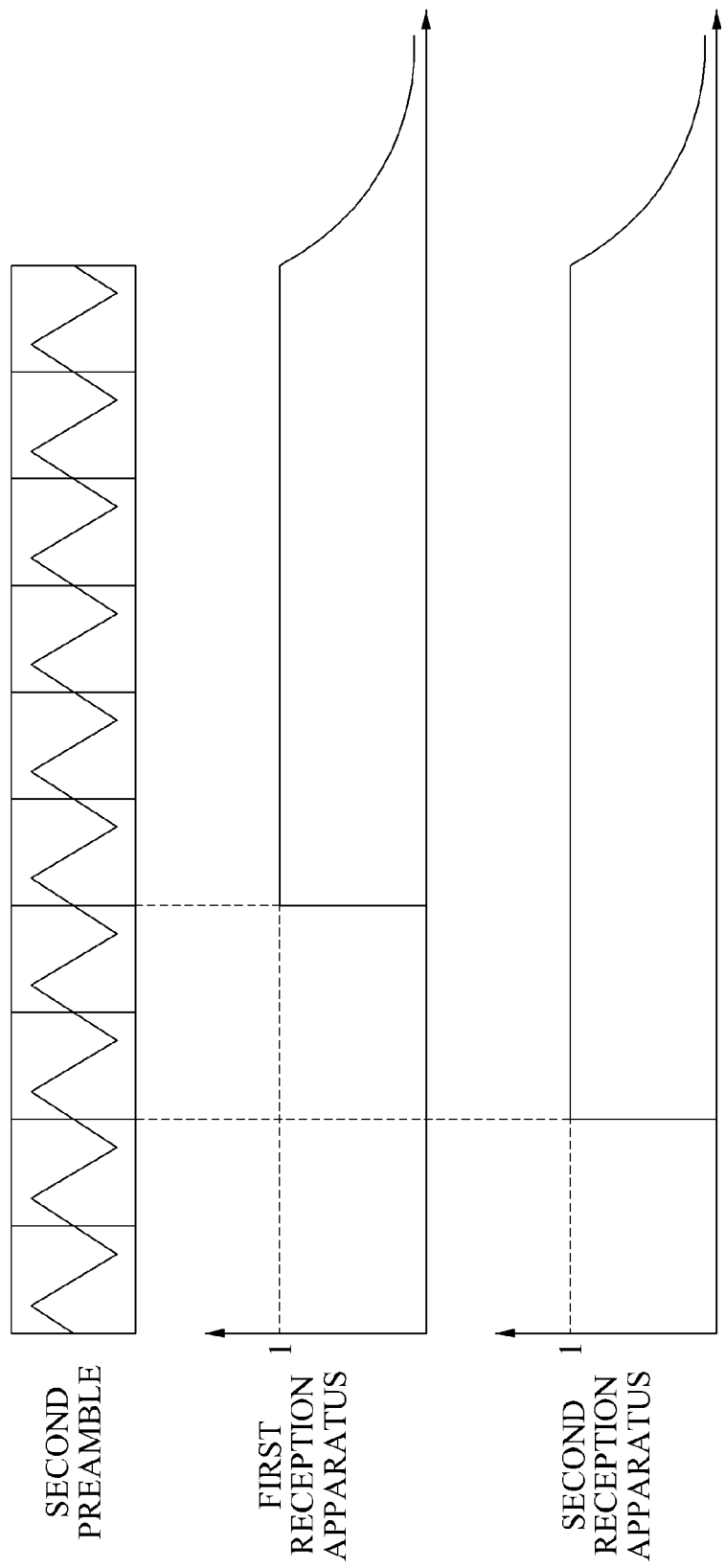
FIG. 4 is a diagram illustrating an example of each reception apparatus receiving a second preamble.

FIG. 4 illustrates an example of each reception apparatus receiving a second preamble.

The second preamble may be repeated during every second time interval. A length of a first time interval may be an integer multiple of a length of the second time interval. Accordingly, in response to an integer number of second preambles being combined, the second preamble may be repeated during every first time interval. Accordingly, in FIG. 4, a first reception apparatus may detect the second preamble after the first time interval is repeated twice, using a first correlation signal.

A second reception apparatus may detect the second preamble after the second time interval is repeated twice.

FIGS. 3 and 4 illustrate examples in which each reception apparatus may receive the preambles of FIG. 2. The first reception apparatus may receive both the first preamble and the second preamble. The second reception apparatus may receive only the second preamble.

Figure 5:
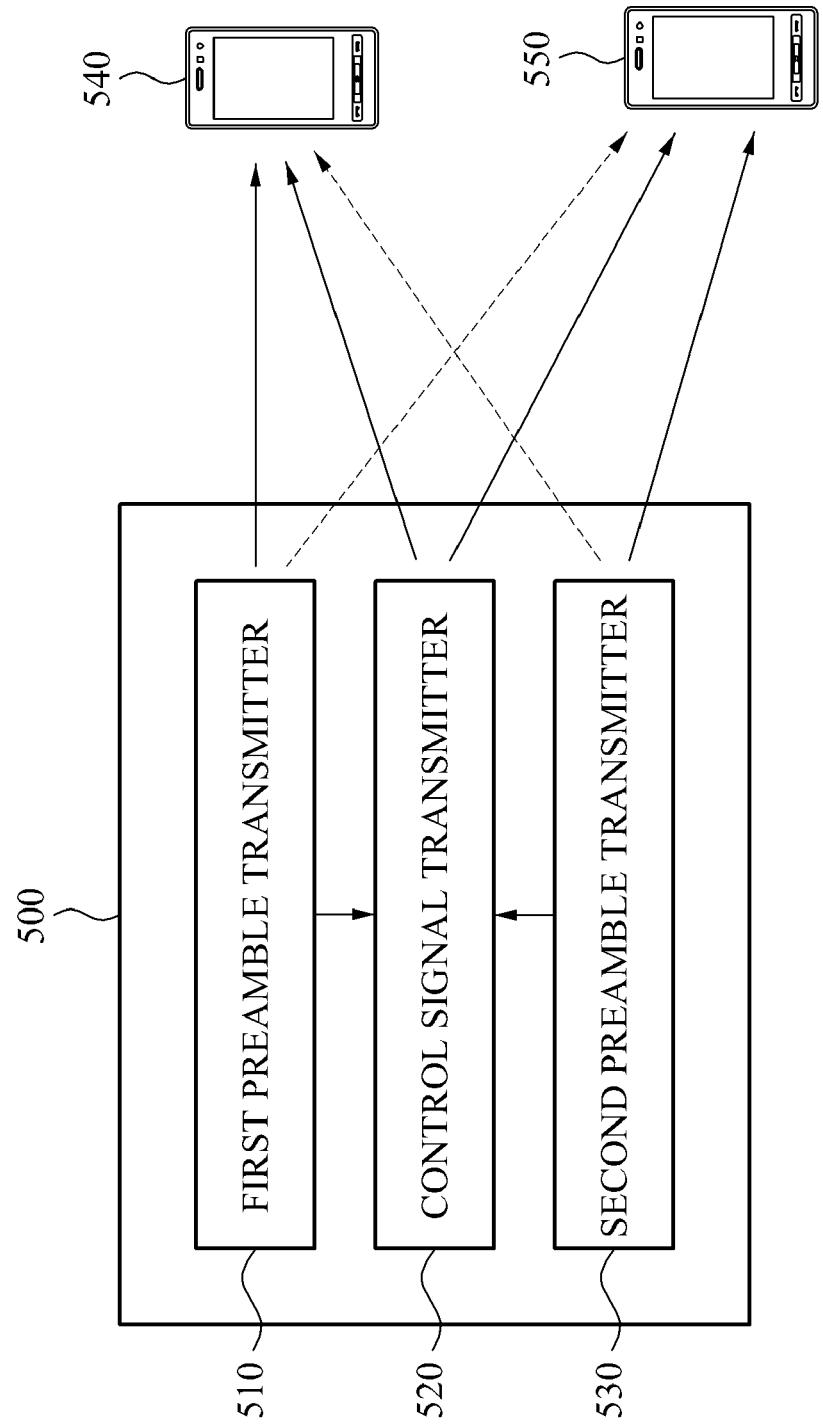
FIG. 5 is a diagram illustrating an example of a transmission apparatus.

FIG. 5 illustrates an example of a transmission apparatus 500.

The transmission apparatus 500 may include a first preamble transmitter 510, a control signal transmitter 520, and a second preamble transmitter 530.

The first preamble transmitter 510 may transmit, to a first reception apparatus 540, a first preamble detectable by the first reception apparatus 540.

The second preamble transmitter 530 may transmit, to a second reception apparatus 550, a second preamble detectable by the second reception apparatus 550.

The first preamble transmitter 510 may transmit the first preamble to the second reception apparatus 550, and the second preamble transmitter 530 may transmit the second preamble to the first reception apparatus 540. In one example, even though the second reception apparatus 550 may not detect the first preamble, the first reception apparatus 540 may detect the second preamble.

A length of the first preamble may be an integer multiple of the second preamble.

The first reception apparatus 540 may denote a reception apparatus that may be stably supplied with a power from a power socket, and the like. The second reception apparatus 550 may denote a reception apparatus that may be supplied with the power using a battery, and the like. In one example, the first reception apparatus 540 may receive data without a limitation on the power, and the second reception apparatus 550 may have some constraints on receiving the data due to a limitation of the power.

As described above, the first reception apparatus 540 may detect both the first preamble and the second preamble. In response to the first reception apparatus 540 receiving data, the power may be unlimited and thus the first reception apparatus 540 may attempt a detection of the first preamble or the second preamble during every time interval in which the first preamble or the second preamble is transmitted. In response to the first reception apparatus 540 succeeding in a preamble detection, the first reception apparatus 540 may determine data is to be transmitted from the transmission apparatus 500. Accordingly, the first reception apparatus 540 may shift from an idle state to an active state, and may receive data from the transmission apparatus 500.

The second reception apparatus 550 may detect only the second preamble. The second reception apparatus 550 may attempt a detection of the second preamble during every time interval in which the second preamble is transmitted. The second reception apparatus 550 may attempt the detection of only the second preamble, and thus may decrease a power consumption compared to the first reception apparatus 540. In response to the second reception apparatus 550 succeeding in the detection of the second preamble, the second reception apparatus 550 may determine data is to be transmitted from the transmission apparatus 500. Accordingly, the second reception apparatus 550 may shift from the idle state to the active state and receive data from the transmission apparatus 500.

The control signal transmitter 520 may transmit a control signal to each of the first reception apparatus 540 and the second reception apparatus 550. Each of the first reception apparatus 540 and the second reception apparatus 550 may detect both the first preamble and the second preamble, or may detect only the first preamble according to the control signal.

Figure 6:
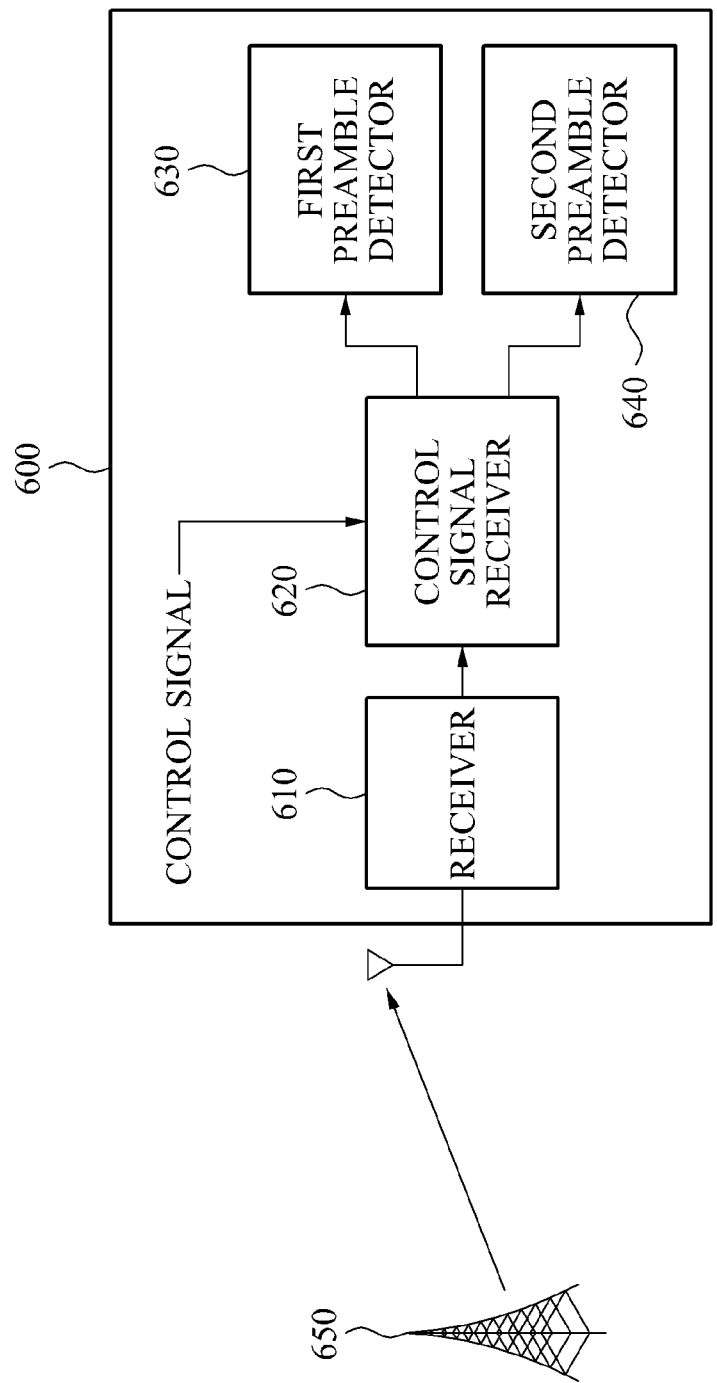
FIG. 6 is a diagram illustrating an example of a reception apparatus.

FIG. 6 illustrates an example of a reception apparatus 600.

The reception apparatus 600 may include a receiver 610, a control signal receiver 620, a first preamble detector 630, and a second preamble detector 640.

The receiver 610 may receive, from a transmission apparatus 650, a signal containing a first preamble or a second preamble.

The control signal receiver 620 may receive a control signal from an upper layer. The control signal may include information associated with a preamble to be detected by the reception apparatus 600.

The first preamble detector 630 may detect the first preamble.

The second preamble detector 640 may detect the second preamble.

In response to the reception apparatus 600 being in an idle state, the control signal receiver 620 may decrease a power consumption of the reception apparatus 600 by inactivating the first preamble detector 630 and the second preamble detector 640, and by cutting off the power.

The transmission apparatus 650 may designate a preamble to be received by the reception apparatus 600, using the control signal. The transmission apparatus 650 may transmit the control signal to the reception apparatus 600. The upper layer of the reception apparatus 600 may recognize the control signal. The control signal receiver 620 may receive the control signal from the upper layer.

The control signal receiver 620 may activate the first preamble detector 630 or the second preamble detector 640 according to the control signal. For example, in response to the control signal indicating, e.g., that "the reception apparatus 600 needs to detect the first preamble," the control signal receiver 620 may activate the first preamble detector 630 during a time interval in which the first preamble is transmitted. As the second preamble detector 640 may not activate, and only the first preamble detector 630 may be activated, a power consumption of the reception apparatus 600 may decrease.

In response to the control signal indicating that "the reception apparatus 600 needs to detect the second preamble," the control signal receiver 620 may decrease the power consumption by activating only the second preamble detector 640.

A length of the first preamble may be an integer multiple of a length of the second preamble. In one example, the first preamble detector 630 may detect the first preamble as well as the second preamble.

Figure 7:
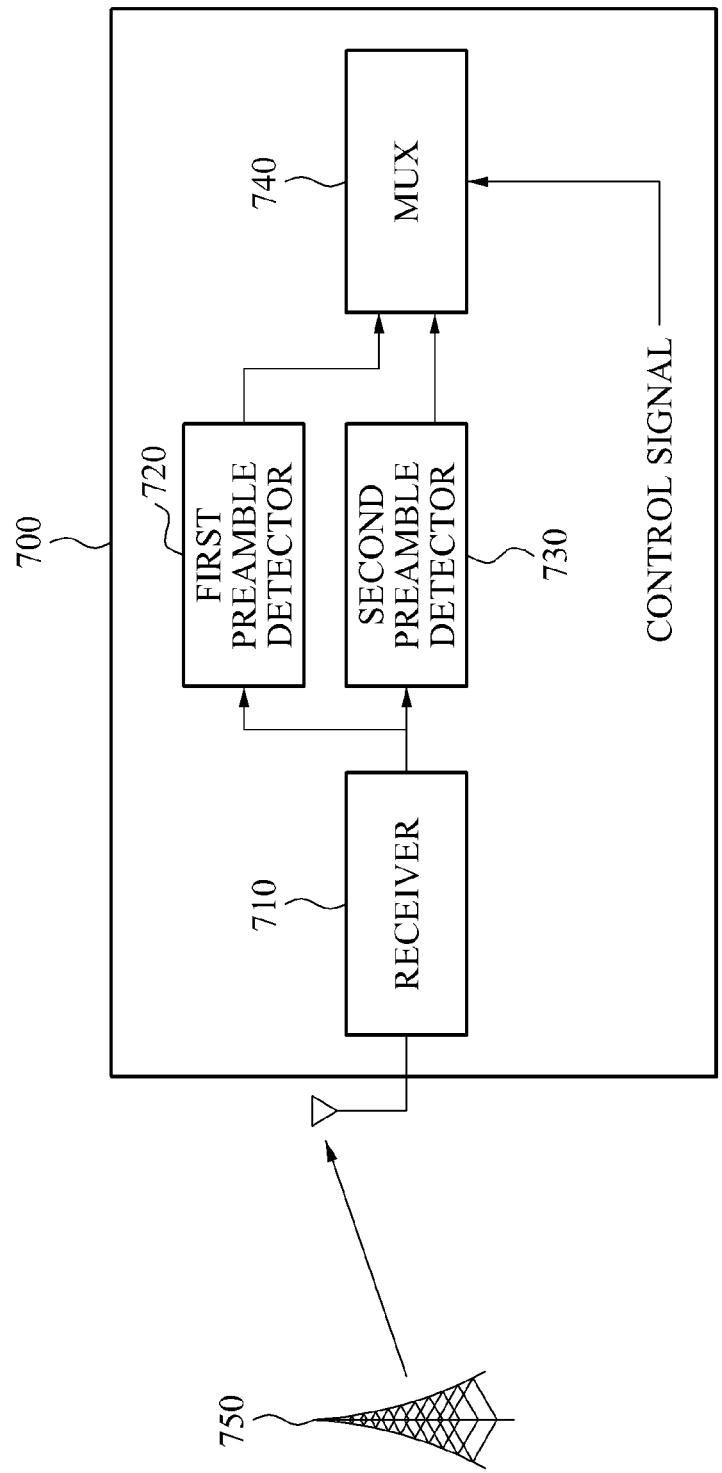
FIG. 7 is a diagram illustrating another example of a reception apparatus.

FIG. 7 illustrates another example of a reception apparatus 700.

The reception apparatus 700 may include a receiver 710, a first preamble detector 720, a second preamble detector 730, and a multiplexer (MUX) 740.

The receiver 710 may receive, from a transmission apparatus 750, a signal containing a first preamble or a second preamble.

The first preamble detector 720 may detect the first preamble included in the received signal. In response to the first preamble being included in the received signal, the first preamble detector 720 may succeed in a detection of the first preamble.

The second preamble detector 730 may detect the second preamble included in the received signal. In response to the second preamble being included in the received signal, the second preamble detector 730 may succeed in a detection of the second preamble.

The MUX 740 may select one of an output of the first preamble detector 720 and an output of the second preamble detector 730, according to the control signal.

For example, the received signal may include the first preamble, and the first preamble detector 720 may detect the first preamble. In one example, the MUX 740 may select the output of the first preamble detector 720, according to the control signal.

The received signal may include the second preamble, and the second preamble detector 730 may detect the second preamble. In one example, the MUX 740 may select the output of the second preamble detector 730.

Figure 8:
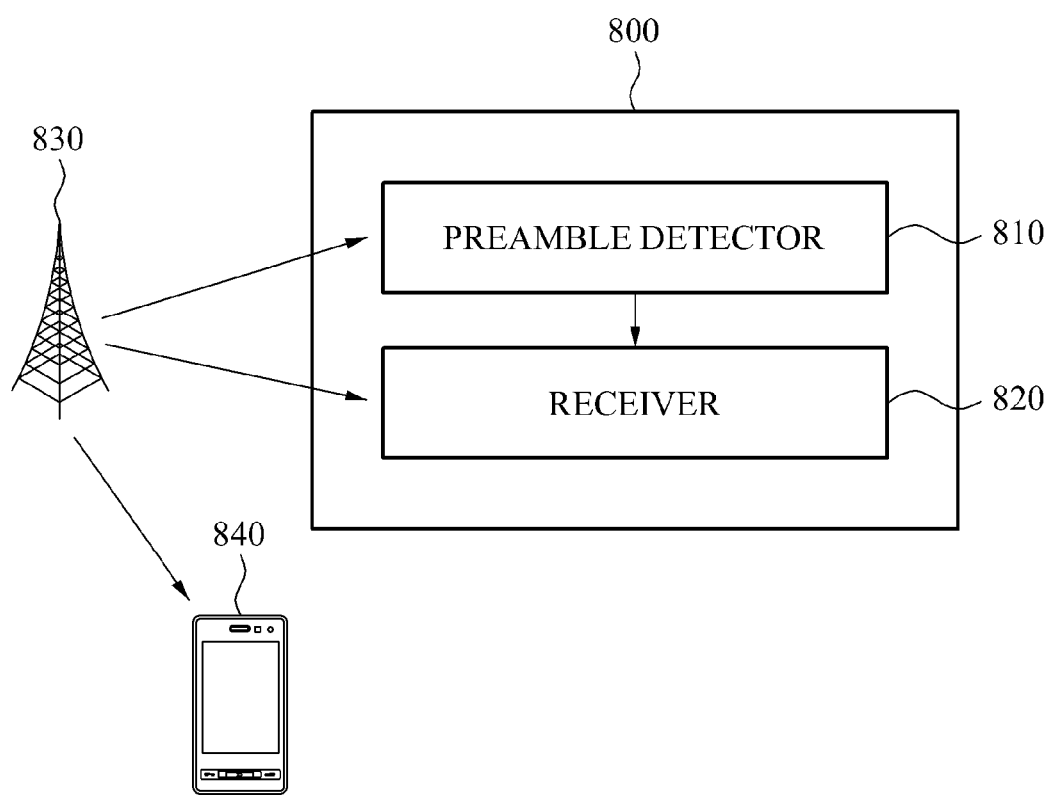
FIG. 8 is a diagram illustrating still another example of a reception apparatus.

FIG. 8 illustrates still another example of a reception apparatus 800.

The reception apparatus 800 may include a preamble detector 810 and a receiver 820.

The reception apparatus 800 may operate to detect both a first preamble and a second preamble, or may operate to detect only the second preamble.

1) In Response to the Reception Apparatus 800 operating to Detect Both the First Preamble and the Second Preamble:

The preamble detector 810 may detect the first preamble or the second preamble received from a transmission apparatus 830. The second preamble may be a preamble detectable by both the reception apparatus 800 and a second reception apparatus 840, and the first preamble may be a preamble detectable by only the reception apparatus 800.

A length of the first preamble may be an integer multiple of a length of the second preamble. In one example, the transmission apparatus 830 may repeatedly transmit the second preamble during a time interval in which the first preamble is transmitted.

The receiver 820 may receive data from the transmission apparatus 830, depending on whether the first preamble or the second preamble is detected. In response to the preamble detector 810 succeeding in a detection of the first preamble or the second preamble, the receiver 820 may receive data from the transmission apparatus 830.

The second reception apparatus 840 may detect the first preamble received from the transmission apparatus 830. In response to the second reception apparatus 840 succeeding in the detection of the first preamble, the second reception apparatus 840 may receive second data from the transmission apparatus 830.

2) In Response to the Reception Apparatus 800 operating to Detect Only the First Preamble:

The preamble detector 810 may detect the second preamble received from the transmission apparatus 830. The second preamble may be a preamble detectable by both the reception apparatus 800 and the second reception apparatus 840. The first preamble may be a preamble detectable by only the reception apparatus 800.

A length of the first preamble may be an integer multiple of a length of the second preamble. In one example, the transmission apparatus 830 may repeatedly transmit the second preamble during a time interval in which the first preamble is transmitted.

The receiver 820 may receive data from the transmission apparatus 830, depending on whether the first preamble is detected. In response to the preamble detector 810 succeeding in a detection of the first preamble, the receiver 820 may receive data from the transmission apparatus 830.

The second reception apparatus 840 may detect the first preamble or the second preamble received from the transmission apparatus 830. In response to the second reception apparatus 840 succeeding in the detection of the first preamble or the second preamble, the second reception apparatus 840 may receive second data from the transmission apparatus 830.

Figure 9:
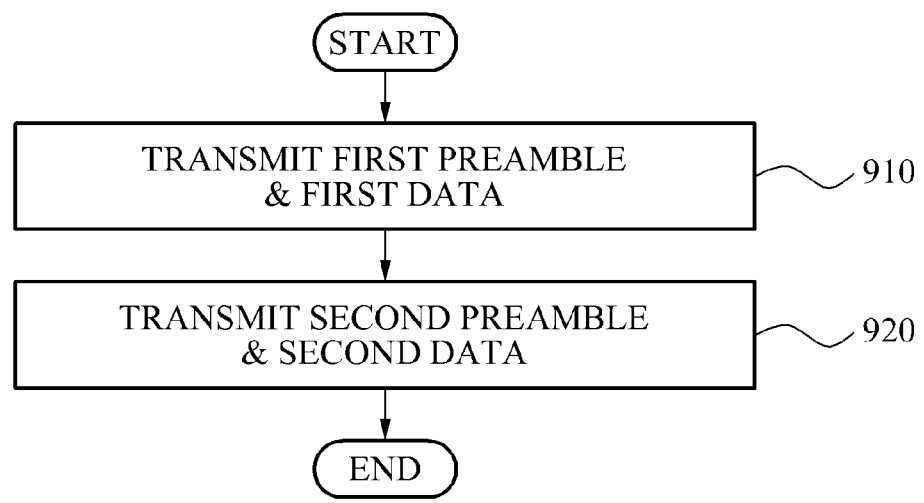
FIG. 9 is a diagram illustrating an example of a data transmission method.

FIG. 9 illustrates an example of a data transmission method.

In operation 910, a transmission apparatus, e.g., transmission apparatus 500 in FIG. 5, may transmit a first preamble and first data to a first reception apparatus, e.g., first reception apparatus 540 in FIG. 5.

In operation 920, the transmission apparatus may transmit a second preamble and second data to the first reception apparatus and to a second reception apparatus, e.g., second reception apparatus 550 in FIG. 5.

The second preamble may be a preamble detectable by both the first reception apparatus and the second reception apparatus. The first preamble may be a preamble detectable only by the first reception apparatus. A length of the first preamble may be an integer multiple of a length of the second preamble.

The transmission apparatus may repeatedly transmit the second preamble during a time interval in which the first preamble is transmitted.

The first reception apparatus may detect both the first preamble and the second preamble. In response to the first reception apparatus succeeding in a detection of the first preamble, the first reception apparatus may receive the first data. In response to the first reception apparatus succeeding in a detection of the second preamble, the first reception apparatus may receive the second data.

The second reception apparatus may detect the second preamble. In response to the second reception apparatus succeeding in the detection of the second preamble, the second reception apparatus may receive the second data.

The first reception apparatus may denote a reception apparatus that may be stably supplied with a power from a power socket, and the like. The second reception apparatus may denote a reception apparatus that may be supplied with the power using a battery and the like. In one example, the first reception apparatus may receive data without a limitation on the power, and the second reception apparatus may have some constraints on receiving the data due to a limitation of the power.

The second reception apparatus may operate only during a time interval in which the second preamble is transmitted, and thus may decrease a power consumption in receiving data.

Figure 10:
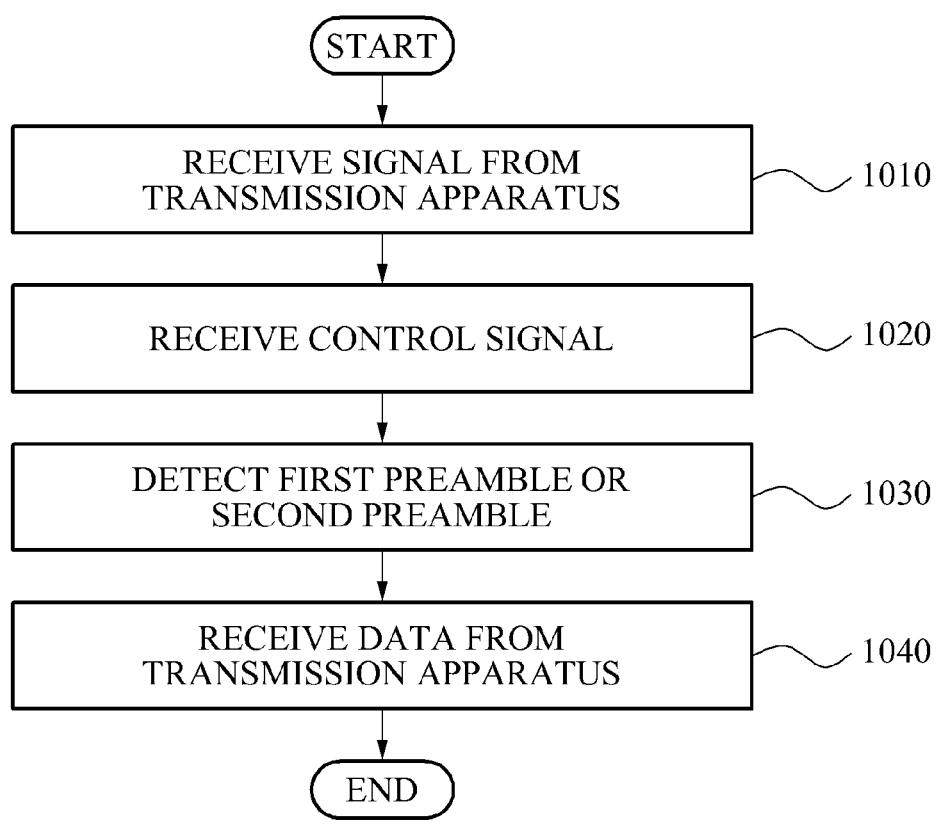
FIG. 10 is a diagram illustrating an example of a data reception method.

FIG. 10 illustrates an example of a data reception method.

In operation 1010, a reception apparatus may receive, from a transmission apparatus, a signal containing a first preamble or a second preamble.

The first preamble may be a preamble detectable by only the first reception apparatus, and the second preamble may be a preamble detectable by the first reception apparatus and the second reception apparatus. A length of the first preamble may be an integer multiple of a length of the second preamble. The transmission apparatus may repeatedly transmit the second preamble during a time interval in which the first preamble is transmitted.

In operation 1020, the reception apparatus may receive a control signal from the transmission apparatus. The control signal may include information associated with a preamble to be received by the reception apparatus.

In operation 1030, the reception apparatus may detect the first preamble or the second preamble according to the control signal.

The control signal may include information associated with one of the first preamble and the second preamble. The reception apparatus may detect only one of the first preamble and the second preamble according to the control signal. The reception apparatus may include a first preamble detector to detect the first preamble and a second preamble detector to detect the second preamble. The reception apparatus may decrease a power consumption by inactivating one of the first preamble detector and the second preamble detector according to the control signal.

In operation 1040, the reception apparatus may receive data from the transmission apparatus, depending on whether the first preamble or the second preamble is detected.

Figure 11:
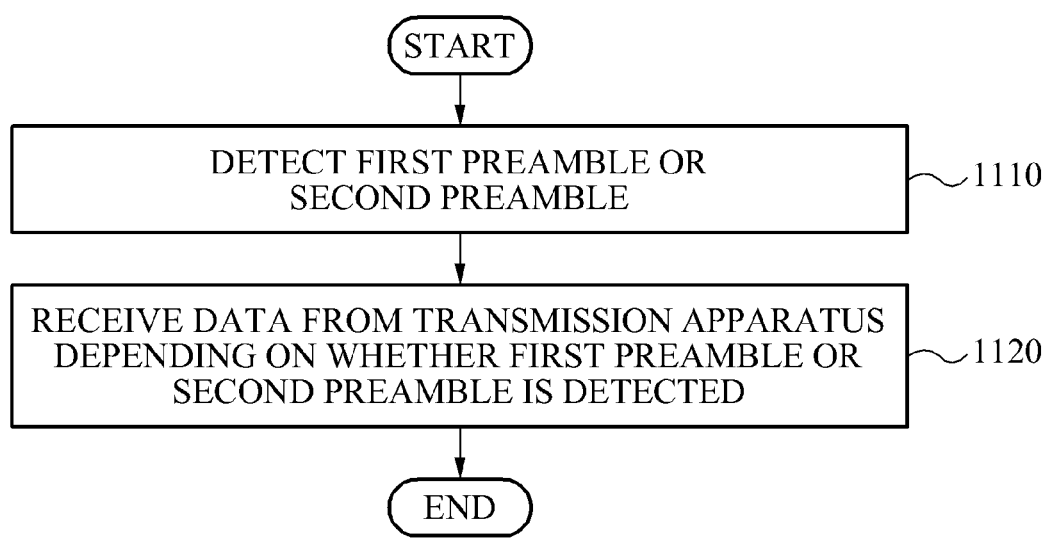
FIG. 11 is a diagram illustrating another example of a data reception method.

FIG. 11 illustrates another example of a data reception method.

In operation 1110, a reception apparatus may detect a first preamble or a second preamble received from a transmission apparatus.

The second preamble may be a preamble detectable by both the reception apparatus and a second reception apparatus, and the first preamble may be a preamble detectable by only the reception apparatus.

A length of the first preamble may be an integer multiple of a length of the second to preamble. The transmission apparatus may repeatedly transmit the second preamble during a time interval in which the first preamble is transmitted.

In operation 1110, the second reception apparatus may detect the second preamble.

In operation 1120, the reception apparatus may receive data from the transmission apparatus, depending on whether the first preamble or the second preamble is detected. In response to the reception apparatus succeeding in a detection of the first preamble, or in response to the reception apparatus succeeding in a detection of the second preamble, the reception apparatus may receive data from the transmission apparatus.

In response to the second reception apparatus succeeding in the detection of the second preamble, the second reception apparatus may receive data from the transmission apparatus.

The second reception apparatus may operate to detect the second preamble only during a time interval in which the second preamble is transmitted, and may not operate during a time interval in which the first preamble is transmitted.

Accordingly, in response to receiving data, it may be possible to decrease a power consumption with respect to a data reception.

According to embodiments, it may be possible to decrease a power consumption of a reception apparatus in an idle state.

According to embodiments, it may be possible to increase a standby time of a reception apparatus.

It should be appreciated that any of the above devices may perform any of the above methods, as consistent with the above disclosure.

The processes, functions, methods and/or software described above may be recorded, stored, or fixed in one or more computer-readable storage media that includes program instructions to be implemented by a computer to cause a processor to execute or perform the to program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, the device described herein may refer to mobile devices such as a cellular phone, a personal digital assistant (PDA), a digital camera, a portable game console, and an MP3 player, a portable/personal multimedia player (PMP), a handheld e-book, a portable tablet and/or laptop PC, a global positioning system (GPS) navigation, and devices such as a desktop PC, a high definition television (HDTV), an optical disc player, a setup and/or set top box, and the like consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It will be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

A number of examples have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A transmission apparatus communicating with first and second reception apparatuses, the transmission apparatus comprising: a first preamble transmitter configured to repeatedly transmit a first preamble and first data to the first reception apparatus; and a second preamble transmitter configured to transmit a second preamble and second data to the first reception apparatus and the second reception apparatus, wherein the second preamble transmitter is configured to repeatedly transmit the second preamble during a time interval that the first preamble is transmitted in response to the first preamble being repeatedly transmitted, and wherein the first preamble is detected by the first reception apparatus by correlating a first correlation signal with the first preamble received from the transmission apparatus and by detecting that a length of the first correlation signal is the same as a length of a first interval in which the first preamble is transmitted, and the second preamble is detected by the second reception apparatus by correlating a second correlation signal with the second preamble received from the transmission apparatus and by detecting that a length of the second correlation signal is the same as a length of a second interval in which the second preamble is transmitted.

2. The transmission apparatus of claim 1, wherein a length of the first preamble is an integer multiple of a length of the second preamble.

3. The transmission apparatus of claim 1, wherein the second preamble transmitter is configured to repeatedly transmit the second preamble only during the second half of the time interval of the transmission of the first preamble.

4. The transmission apparatus of claim 1, wherein the first preamble comprises a sinusoidal wave that decreases in amplitude from a beginning of the time interval and an ending of the time interval, and the second preamble comprises a triangular wave that has a constant amplitude.

5. A reception apparatus, comprising:
a receiver configured to receive, from a transmission apparatus, a signal comprising a first preamble and another signal comprising a second preamble;
a control signal receiver configured to receive a control signal;
a first preamble detector configured to detect the first preamble by correlating a first correlation signal with the signal received from the transmission apparatus and by detecting that a length of the first correlation signal is the same as a length of a first interval in which the first preamble is transmitted; and
a second preamble detector configured to detect the second preamble by correlating a second correlation signal with the signal received from the transmission apparatus and by detecting that a length of the second correlation signal is the same as a length of a second interval in which the second preamble is transmitted, wherein:
the control signal receiver is configured to activate the first preamble detector to detect the first preamble in response to the control signal indicating a first operational state and is configured to activate the second preamble detector to detect the second preamble in response to the control signal indicating a second operational state, and in response to the first preamble or the second preamble being detected, the receiver is further configured to receive data from the transmission apparatus.

6. The reception apparatus of claim 5, wherein a length of the first preamble is an integer multiple of a length of the second preamble.

7. The reception apparatus of claim 5, wherein the second preamble detector is configured to detect the second preamble in response to a length of the second correlation signal being the same as a length of the second preamble.

8. The reception apparatus of claim 5, wherein the reception apparatus is configured to shift from an idle state, in which a consumption of power is reduced, to an active state.

9. The reception apparatus of claim 5, wherein, in response to the length of the first preamble being an integer multiple of the length of the second correlation signal, the second preamble detector is configured to detect the second preamble without detecting the first preamble.

10. The reception apparatus of claim 5, wherein the first preamble detector is configured to detect the second preamble in response to the first interval being repeated twice, using the first correlation signal.

11. The reception apparatus of claim 5, wherein the first preamble detector is configured to detect the second preamble and the first preamble in response to the first interval being repeated twice, using the first correlation signal, without detecting the second preamble in response to the second preamble not being repeated beyond the first interval.

12. The reception apparatus of claim 5, further configured to decrease a power communication in response to the data not being transmitted from the transmission apparatus, and in response to the reception apparatus detecting one of the first preamble and the second preamble.

13. The reception apparatus of claim 5, further comprising a control signal receiver configured to selectively activate and deactivate a first preamble detector without activating a second preamble detector in response to a control signal indicating a reception apparatus to detect the first preamble.

14. A communication method, comprising:
transmitting a first preamble and repeatedly transmitting a second preamble during a time interval in which the first preamble is transmitted;
transmitting first data to a first reception apparatus, the first data being received by the first reception apparatus in response to the first preamble being detected by the first reception apparatus by correlating a first correlation signal with the signal received from the transmission apparatus and by detecting that a length of the first correlation signal is the same as a length of a first interval in which the first preamble is transmitted; and
transmitting second data to the first reception apparatus and a second reception apparatus,
receiving the second data by the first reception apparatus in response to the first reception apparatus detecting the second preamble by correlating a second correlation signal with the signal received from the transmission apparatus and by detecting that a length of the second correlation signal is the same as a length of a second interval in which the second preamble is transmitted, and
receiving the second data by the second reception apparatus in response to the second reception apparatus detecting the second preamble.

15. The communication method of claim 14, wherein a length of the first preamble is an integer multiple of a length of the second preamble.

16. A reception method, comprising:
receiving, from a transmission apparatus, a signal comprising a first preamble and another signal comprising a second preamble;
receiving a control signal;
detecting the first preamble in response to the control signal indicating a first operational state by correlating a first correlations signal with the signal received from the transmission apparatus and by detecting that a length of the first correlation signal is the same as a length of a first interval in which the first preamble is transmitted;
detecting the second preamble in response to the control signal indicating a second operational state by correlating a second correlation signal with the signal received from the transmission apparatus and by detecting that a length of the second correlation signal is the same as a length of a second interval in which the second preamble is transmitted; and
receiving data from the transmission apparatus in response to either the first preamble or the second preamble being detected.

17. The reception method of claim 16, wherein a length of the first preamble is an integer multiple of a length of the second preamble.

18. The reception method of claim 16, wherein the second preamble detector is configured to detect the second preamble in response to a length of the second correlation signal being the same as a length of the second preamble.

19. The reception method of claim 16, wherein the first operational state is an idle state and the second operational state is an active state, and further comprising:
shifting from the idle state, in which a consumption of power is reduced, to the active state.

20. A non-transitory computer-readable medium comprising a program for instructing a computer to perform the method of claim 16.

* * * * *